June 18, 1940.    L. M. RADER    2,204,621
PROCESS FOR THE RECOVERY OF ORGANIC ACIDS AND OTHER
SUBSTANCES FROM A TOBACCO EXTRACT
Filed July 15, 1938
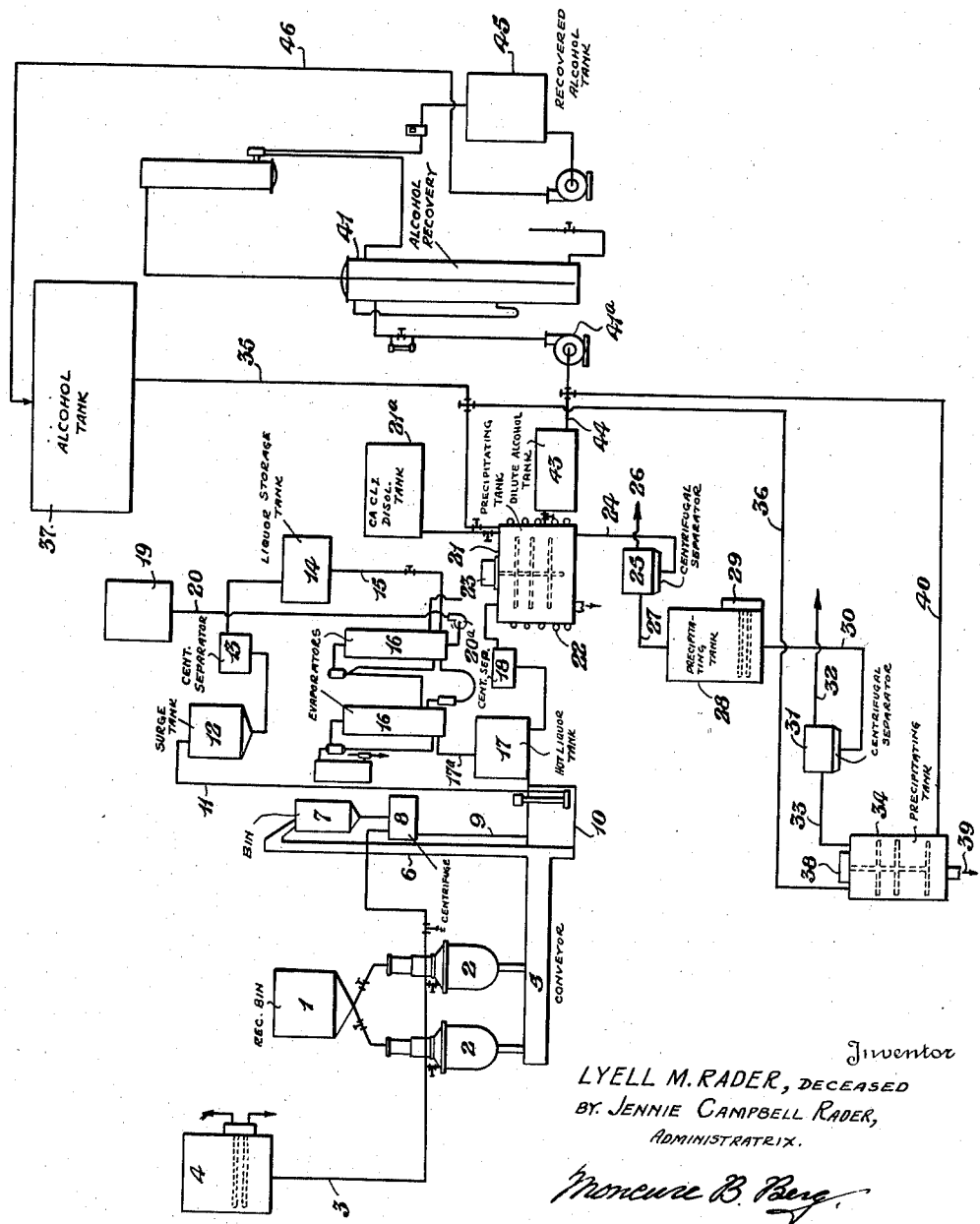
Inventor
LYELL M. RADER, DECEASED
BY JENNIE CAMPBELL RADER,
ADMINISTRATRIX.
Moncure B. Berg
Attorney Patented June 18, 1940

2,204,621

UNITED STATES PATENT OFFICE 2,204,621

PROCESS FOR THE RECOVERY OF ORGANIC ACIDS AND OTHER SUBSTANCES FROM A TOBACCO EXTRACT

Lyell M. Rader, deceased, late of Burlington, N. C., by Jennie Campbell Rader, administratrix, Burlington, N. C., assignor to Chemical Extraction Corporation, Elkton, Ky., a corporation of Kentucky Application July 15, 1938, Serial No. 219,482

13 Claims. (Cl. 260—527)

The invention relates to the processing of tobacco and more particularly has reference to a process for recovering certain valuable substances and compounds which have been extracted therefrom.

More specifically the invention concerns the recovery of certain polybasic acids, such as citric, malic and oxalic acids, as well as other constituents of the tobacco. Heretofore these acids have been obtained from fruits. Their cost has been relatively high due to the complicated extraction procedure, low extraction and recovery yield, the fact that only a very low percentage of the juices of the fruit, from which they are extracted, can be used, and also the fact that culls are employed rather than choice or eating fruit, it being commercially impractical to use the latter. Moreover undesirable acetic acid is obtained with the polybasic acids on their extraction.

As is known citric, malic, and oxalic acids are constituents of tobacco. However, their extraction is most difficult if not impossible due to the presence in the tobacco of nicotine, albuminous material including vegetable albumin, and also some form of pectin. This difficulty may be overcome if the nicotine is first entirely extracted from the tobacco, the acids mentioned converted into their water soluble salts and through suitable processing the albuminous matter and pectin rendered water insoluble. The salts as well as the remaining valuable constituents of the tobacco are removed in a water extract along with the albuminous matter and the pectin, the tobacco on the removal of the extract being left in the form of cellulose.

As will hereinafter appear his invention provides a simple and highly efficient and hence inexpensive process for recovering the organic acid salts and the other compounds and substances of value from the water extract while ridding the same of the vegetable albumen and the pectin which though water insoluble prevents the employment of ordinary recovery methods.

It is hence the major object of this invention to provide a novel, inexpensive and efficient process for recovering certain of the valuable constituents extracted from tobacco.

An equally important object of the invention is the provision of a method for recovering, from an extract obtained by processing tobacco, organic acids and other tobacco constituents dissolved in the extract while freeing the latter of albuminous material and pectin.

Another object of his invention is to provide a process for recovering salts of polybasic acids from an extract obtained from completely denicotinized tobacco in which any vegetable albumen and pectin therein has been made water insoluble.

Still another object is to provide a method for recovering citric, malic and oxalic acids in the form of their water soluble salts as well as other water soluble constituents of the tobacco from a water extract obtained from tobacco which has been completely denicotinized and which has had the albuminous matter and pectin therein rendered water insoluble.

A further object of the invention is to coagulate the albuminous material and the pectin and to remove the same by high speed centrifugal separation to permit the recovery of water soluble salts of organic acids and other soluble constituents of tobacco contained in a water extract obtained from denicotinized tobacco, the albuminous matter and pectin being in insoluble form.

Yet a further object of the invention is to provide a process for the recovery of citric, malic and oxalic acids, certain alkalies, ammonia compounds, phosphates and nitrogenous matter from a water extract, also containing water insoluble albuminous matter and pectin, obtained from denicotinized tobacco wherein the albuminous matter and pectin are removed by high speed centrifugal separation, the acids recovered as a precipitate of their calcium salts by the addition of reagents to the extract and the other constituents recovered as a still deposit obtained on distallation of the remaining extract or mother liquor to recover the reagent in the same for reuse in the process.

With these and other objects in view the invention consists in the method to be hereinafter set forth and claimed with the understanding that the steps thereof, the apparatus described for carrying them out and the reactants used as well as their quantities may be widely varied by those skilled in the art without departing from the spirit of the invention or the scope of the appended claims.

Briefly the invention comprehends the recovery of citric, malic, and oxalic acids, alkalies, ammonia compounds and nitrogenous matter from a tobacco extract. One method of practically effecting this concept is to recover these constituents of tobacco from a water extract obtained from tobacco which has been denicotinized and which has had the vegetable albumen and pectin therein rendered water insoluble.

The invention includes removing, from this extract in which the acids are present in the form of their dissolved ammonia salts and in which the other constituents noted above are also in solution, the albuminous matter and pectin as well as any other water insoluble matter, by progressive high speed centrifugal separation which frequently occurs as the recovery process advances to its completion. The extract is evaporated to concentrate it while a neutral astringent is added to coagulate any albuminous matter and pectin contained therein for the purpose of facilitating removal of the latter.

The mother liquor is now ready to have the acid values therein recovered. This may be accomplished by precipitating them all together as calcium salts of the acids by the addition of calcium chloride and alcohol to the extract or they may be recovered separately. The latter may be carried out by adding only the calcium chloride to the extract and through suitable processing including cooling, agitating and heating of the extract obtaining separate precipitates of calcium oxalate and calcium citrate. After separation of these oxalate and citrate salts from the mother liquor, calcium malate is precipitated by adding alcohol to the extract and is removed therefrom. Where the calcium salts of the acids are precipitated together they are separated from each other. No matter how obtained the separate salts are subjected to refining and recrystallization for conversion into their acids.

After recovery of the acid salts there still remains in the mother liquor the other previously described tobacco constituents and also alcohol used in the process. To recover the alcohol for reuse the extract is distilled and the alcohol thus obtained sent to a storage tank. This procedure results in the leaving of a still deposit which contains the alkalies, ammonia compounds, phosphates and nitrogenous matter. If desired, this deposit may be mixed with the tobacco which has been reduced to cellulose and from which it has been extracted to provide a fertilizer or any other use may be made of the deposit.

In order to make his invention more clearly understood I have shown in the accompanying drawing, means for carrying the same into practical effect without limiting the improvements in their useful application to the particular constructions which, for the purpose of explanation have been made the subject of illustration.

In the drawing the figure shows a flow sheet for a plant designed to carry out the process of this invention.

Throughout the drawing similar reference numerals refer to like parts and elements shown on the flow sheet.

As herein pointed out the invention relates to a process for the recovery of all of the valuable organic and inorganic constituents dissolved in a water extract obtained in the treatment of completely denicotinized tobacco. To this end a tobacco treated in accordance with the denicotinizing method described in his co-pending application Serial No. 219,483, filed July 15, 1938, is further processed to obtain an extract in accordance with the teachings set forth in Patent No. 2,079,997, issued May 11, 1937, to Emerson Fletcher Lyford.

In his application above referred to he has shown as a final product an oil free tobacco from which the entire nicotine and chlorophyll content has been extracted. There remains in this tobacco ammonia salts of oxalic, citric and malic acids, (due to the use of ammonia in displacing the nicotine and chlorophyll of the tobacco in the process of my co-pending application) together with potassium, sodium and calcium alkalies, ammonia compounds, phosphates and nitrogenous matter. It is these constituents which it is desired to recover. However, there is also a certain amount of water soluble albuminous matter and pectin in the tobacco which must be made insoluble in order to obtain the desired valuable tobacco constituents from a water extract. This may be accomplished by following the Lyford process and obtaining the tobacco values as solutes in a water extract in which the albuminous matter and pectin are present in insoluble form.

In accordance with the Lyford process denicotinized tobacco is placed in an extractor and subjected to heat treatment as for example by "live steam" which is allowed to condense to boiling water and to which may be added boiling water or boiling water may be used alone. All of this time the tobacco is undergoing violent agitation, which continues for some time. The effect of this treatment is to render the albuminous matter and pectin water insoluble and to float it off from the tobacco. At the same time the valuable constituents which it is desired to extract from the tobacco are dissolved by the water. It is here that the process forming the subject of this invention begins, namely the recovery of the substances already named from this extract or mother liquor.

As shown in the drawing, in carrying out his invention, tobacco, from which nicotine and chlorophyll has been removed in accordance with the practice disclosed in his previously mentioned co-pending application, is loaded into the receiving bin 1 from which it is emptied into one or more extractors 2. A hot water line 3 connects the extractor or extractors with a hot water tank 4 which is suitably heated as shown. Also a steam line (not shown) may be run to the extractors.

The type of extractor used is such that the tobacco contained therein may be subjected to extremely violent agitation. This is begun as soon as the mechanism is loaded and then boiling water is introduced into the extractor. Agitation of the tobacco continues for a time sufficient to cause all of the constituents of the tobacco which it is desired to extract therefrom to go into solution or to be taken up by the water. As a result of this treatment and the prior nicotine and chlorophyll removal the tobacco is reduced to cellulose.

He has discovered that for extraction purposes boiling water alone works most satisfactorily. Also he has found that its amount may be determined by the nicotine content of the tobacco before complete denicotinization. For example in processing any Kentucky tobacco, which will average a 4% nicotine content, 3 pounds of water per pound of tobacco is used to obtain the extract. The quantity or volume of boiling water employed will be less for a tobacco of a lower nicotine content and will be greater than that described for a tobacco with an original nicotine content well over 4%.

After this treatment the tobacco and the mother liquor are ready for further processing to recover the desired chemical values in the extract. To accomplish this the entire contents, tobacco and water, of the extractor or extractors 2 are removed therefrom and by means of conveyor 5 and elevator 6 are introduced into a storage bin 7 from whence they are feed into a centrifuge 8 where as much of the water as is possible is centrifuged off from the tobacco. This liquor obtained from centrifuging is taken through line 9 to the receiving tank 10 from whence it is pumped through the line 11 into a surge tank 12 and then allowed to enter a centrifugal separator or clarifier 13 from which it is sent to a liquor storage tank 14.

Despite centrifuging, which is done at very high speed, there still remains in the tobacco mass some of the extract or liquor containing the materials which it is desired to recover. To remove this so called "center water," the tobacco mass in the centrifuge has added thereto 1 pound of clean boiling water per pound of tobacco. (The amount of the wash water is based on that needed for tobacco with an original nicotine content of 4%.) This water washes out any remaining original water which may still be in the tobacco. After centrifuging the "wash" water is sent to the liquor storage tank, in the manner previously described, and is added to the mother liquor therein. If desired the original extract obtained in initial centrifuging may be held in the receiving tank 10 and the wash water added to it there after which the mixture, which will hereinafter be referred to as the mother liquor or extract, is then passed to the storage tank 14 as already outlined.

While he has described how a water extract having in solution all the valuable constituents remaining in tobacco after the extraction of nicotine and chlorophyll may be obtained, it should be kept in mind that this extract contains albuminous matter and pectin, the presence of which, although in insoluble form, prevents recovery of the substances and compounds it is desired to recover. Hence it is essential that these unwanted substances be removed so that the solutes of the extract may be recovered.

Experience has shown that they cannot be removed by filtration for the reason that the albuminous matter and the pectin will clog any type of filter now in use. It has been discovered, however, that they may be removed from the mother liquor or extract by centrifugal separation at extremely high speeds. Frequent resort must, however, be made to this separation means due to the tenacious tendency these substances have for remaining in the mother liquor. To this end use is made of progressive high speed centrifugal separation as the recovery process advances so that the albuminous material and pectin will at least be reduced to such an infinitesimal quantity, if not entirely removed, as to allow the unhindered recovery of the desired compounds and substances. The centrifugal separation also effectively removes any other insoluble tobacco constituents which may be contained in the extract.

All of the centrifugals described or to be hereinafter described for use with the process, as for example the centrifuge and clarifiers, have their rotating separator elements driven at a peripheral speed of from 9,000 to 10,000 feet per minute. Very satisfactory results have been obtained with the speeds just given. Higher speeds may be used where the mechanical construction of the centrifugal permits of such. The height of these speeds will be appreciated when it is considered that the drum and/or agitator blades used in agitating the tobacco in the extractors 2 are rotated at 60 R. P. M. or a peripheral speed of less than a tenth of that at which the centrifugals are driven.

From the foregoing description it will be appreciated that some pectin and vegetable albumen are removed from the extract in the centrifuging and washing step of the process in which occurs the centrifuge 8. It should be noted however that this centrifuging also has the additional function of literally "wringing" the tobacco dry or in other words, removing all of the extract from the tobacco.

The mother liquor in the storage tank 14 is now ready for final preparation, including concentrating the extract and removing albuminous material and pectin, to allow the beginning of the recovery of the substances and compounds it is the purpose of the invention to obtain. To accomplish this the mother liquor is sent through line 15 to evaporators 16 where it is concentrated by having 75% of its volume evaporated off, the vapors being taken off in any well known manner and the concentrate being removed from the evaporator through pipe line 17a to the hot liquor storage tank 17. The effects of the evaporation treatment is to concentrate the mother liquor into a smaller volume which facilitates the recovery of the tobacco constituents therein. Also excess or free ammonia in the extract, resulting from the use of such gas in denicotinizing the tobacco, is removed.

To assist in the removal of albuminous matter and pectin, which remains in the mother liquor as it comes from the storage tank 14, a sufficient quantity of a neutral astringent is added thereto for the purpose of coagulating these substances. Suitable astringents include alum, iron chloride and sumac. The astringent may be added either prior to or during evaporation of the mother liquor. As shown in the drawing the astringent from a reservoir 19 is passed through pipe line 20 and by means of the pump 20a is forced into the evaporators as the mother liquor undergoes evaporation. This means of coagulating the albuminous material and the pectin has proved very satisfactory.

From the hot liquor tank the mother liquor, now concentrated to 25% of its original volume, is sent through a clarifier 18 and from there to the first precipitate tank 21. In the clarifier 18 which is of the high speed type centrifugal separation of albuminous material and pectin from the extract again takes place. This separation in the majority of instances removes all of the albuminous material and pectin left in the mother liquor after the treatment already described. In any event such infinitesimal traces of these substances are left in the extract after it has passed through the clarifier 18 that recovery of those substances which it is desired to obtain for commercial use may be effectively proceeded with, this latter beginning in the precipitate tank 21. Also any other insoluble matter remaining in the extract is removed.

Recovery of the organic acids in the form of their salts is now begun in the precipitate tank 21. To assist in such recovery, the tank is provided with a cooling coil 22 for cooling the hot liquor as it comes from the hot liquor tank 17 and clarifier 18 and also with a blade agitator 23. The recovery of the salts of the citric, malic and oxalic acids may be accomplished by precipitating these salts simultaneously or separately. Either practice results in a like yield of these substances but from a commercial standpoint it is preferred to precipitate them separately.

In the recovery as separate precipitates it should be noted that the mother liquor comes into the precipitate tank 21 at a very high temperature. It is now cooled down at least to 70° F.

through the operation of the cooling coil 22. A precipitant which will, under proper conditions, cause the precipitation of all the acid salts is now added to the cooled liquor. Such a precipitant is calcium chloride which is introduced into the cooled liquor from the storage tank 21a in a volume slightly in excess of the theoretical amount needed to satisfy and precipitate all of the acid salts in the mother liquor. This required volume is readily determined since from analysis of the tobacco prior to any processing its acid content for the acids being recovered is known. The result of the addition of the calcium chloride is to immediately precipitate the salt of the oxalic acid as calcium oxalate.

It has been pointed out that in denicotinizing the tobacco gaseous ammonia has been employed. This ammonia frees the nicotine and combines with the organic acids present in the tobacco to form ammonia salts of these acids. What now happens, when the calcium chloride is added to the mother liquor, is metathesis. That is the calcium of the calcium chloride replaces the ammonia in the ammonia acid salts and converts them into calcium salts of citric, malic and oxalic acids. These calcium salts, under proper conditions, are easily and readily precipitated from the mother liquor. In fact as already noted the calcium oxalate is precipitated from the cooled liquor immediately on the addition of the precipitant.

After the formation of the calcium oxalate, this precipitate and the mother liquid are passed through line 24, to a clarifier 25 where the oxalate is removed by centrifugal separation and taken off through line 26 while the mother liquor is sent through line 27 to a second precipitate tank 28 for recovery of the calcium citrate contained therein.

Further treatment of the precipitated calcium oxalate is necessary to refine it and convert it into its acid. This includes the addition of the usual reagents to the oxalate to free the calcium, filtration, and crystallization, by evaporation and drying, to obtain the acid.

The mother liquor in the precipitate tank 28 now contains calcium salts of citric and malic acids. As already mentioned, under proper conditions the citric salt may be precipitated. For this purpose the precipitate tank is provided with a steam coil 29, connected to a suitable steam source. The coil is operated until the temperature of the mother liquor is raised to 212° F. and is held at that temperature for a short time, usually about a minute. This procedure results in the precipitation of calcium citrate. After formation of the precipitate the entire contents of the precipitate tank 28 are passed through line 30 to a high speed clarifier 31. In the clarifier the mother liquor and precipitate are centrifugally separated, the former being sent by line 33 to a third precipitate tank 34 while the precipitate of calcium citrate is drawn off as indicated at 32. On removal from the clarifier 31 the calcium citrate is refined in a manner similar to that described in connection with the treatment of the calcium oxalate so as to convert it into citric acid.

Alcohol is used to obtain the calcium malate in the mother liquor. Two volumes of alcohol per volume of liquor in the tank 34 are introduced therein by way of pipe lines 35 and 36. Agitation of the liquor by agitator 38 effects precipitation of calcium malate. After precipitation of the malate the mother liquor, now containing only alcohol and certain tobacco values, is drawn off from the precipitate tank for further treatment while the calcium malate is removed therefrom for refining and conversion into malic acid by means similar to those already outlined for the other acid salts.

If calcium chloride and alcohol, in the volumes mentioned, are simultaneously added to the mother liquor in the tank 21 while the liquor is agitated with agitator 23 the calcium salts of the organic acids will be precipitated in mass. This is the second recovery practice. After precipitation the liquor is drawn off into the dilute alcohol tank 43 for further processing, while each of the salts are separated from the precipitate and is refined and converted into its acid by methods like those already described.

While certain volumes or quantities of reagents have been specified it should be noted that use of greater quantities of calcium chloride and alcohol will not affect the practice of the process.

The acids and their salts are recovered in an exceptionally pure state. They are entirely free of objectionable acetic acid and salts thereof while each separate precipitate is obtained free of the salts of the other acids it is desired to recover. Even in pilot or test plant operations, which are of course rough and approximate at best, this has been true in nearly all runs.

This present process, is a link in a chain of processes designed to extract all of the constituents of the tobacco plant and to recover the valuable ones for commercial use while reducing the tobacco to cellulose. Actually the recovery process herein described is part of a whole, the products obtained by its practice being by-products from the main extraction and recovery of nicotine from the plant. Most valuable of these are the citric, malic and oxalic acids. While the content of some of these organic acids in the tobacco is relatively small, it will be appreciated that where a high extraction yield, is coupled with a high recovery yield it is commercially practical to recover these acid values after the extraction and recovery of the nicotine and chlorophyll. As previously outlined in recovering each acid from its calcium salt, the calcium is precipitated and removed by filtration while the remaining solution is concentrated to crystallize the acid contained therein. For the first tobacco batch processed this gives a comparatively low acid recovery yield. However, where the concentrated acid solution of the first run is added to that of the next succeeding run and this practice is continued for several runs a high recovery yield for each acid may be procured. Through such procedure recovery yields for citric, oxalic and malic acids of consistently over 94% of the total content of each of these acids in the tobacco plant have been obtained. To bear this out is the fact that laboratory control samples of extracts made up of pure chemicals and processed in accordance with the method herein outlined have shown a recovery yield average for all the desired acids of 98.8% and individual acid recovery yields of over 99% for each of the desired acids.

It has been previously pointed out that the process of this invention is one of a chain designed to extract and recover all of the valuable and useful constituents of tobacco. What might be referred to as a by-product of the main acid recovery herein described or as a sub by-product of the chain of processes, is the recovery from the mother liquor of the tobacco chemical values which remain after separation therefrom of the organic acid salts. These include ammonia, potassium, sodium and calcium alkalies, other ammonia compounds, phosphates and nitrogenous matter. Also the motor liquir contains alcohol, remaining from the separation of the malic acid salt, which it is desired to recover for reuse in the process. On distillation the chemical values referred to, are obtained as still deposit while the alcohol is recovered as a distillate.

Where the acid salts are precipitated separately, the mother liquor is drawn off from the precipitate tank 34 and is pumped through lines 40 and 44 into the recovery still 41 by means of the pump 41a. On the other hand where all of the acid salts are precipitated together, the mother liquor is drawn from precipitate tank 21 into the dilute alcohol tank 43 and from there is pumped through line 44 into the still.

Distillation is begun with the mother liquor in the still. The alcohol is recovered in the recovery tank 45 and is pumped through line 46 to the storage tank 37 for reuse while the remaining tobacco constituents are removed from the still in the form of a crude still deposit. Suitable means, not shown, may be provided for supplying the alcohol storage tank with fresh alcohol to compensate for mechanical or operating losses.

It will be appreciated that the tobacco constituents noted as being present in the still deposit are good fertilizing materials. This deposit may be used to form a fertilizer mixture by adding it to or incorporating it with the cellulose remaining after its extraction from the denicotinized tobacco. Of course it will be well understood by those skilled in the art that the use of the cellulose and the still deposit is not limited to the one just described for they may be used separately or together for many other and varied purposes.

Since the still deposit is really a crude or unrefined mixture of all the tobacco ingredients remaining in the mother liquor after the extraction, separation and recovery of the substances herein described, its recovery yield is best considered in pounds. In the treatment of Kentucky tobacco or tobacco with a nicotine content of about 4% this yield will average around 20 pounds of still deposit per 100 pounds of tobacco.

From the foregoing it will be appreciated that he has provided a simple, highly efficient, and hence inexpensively practiced process for recovering organic acids and other compounds from a tobacco extract obtained from denicotinized tobacco. It will also be realized that he has provided a process, which by freeing the tobacco extract from substances whose presence would prevent recovery of the desired tobacco constitutents, allows the completion of a chain of processes working to the practical commercial extraction and recovery of all of the valuable constituents of tobacco.

While I have shown and described the preferred embodiment of his invention, I wish it to be understood that the invention is not confined to the specific method steps, reactants, and details of construction for carrying out the process herein set forth, by way of illustration, as it is apparent that many changes and variations may be made therein, by those skilled in the art, without departing from the spirit of the invention, or exceeding the scope of the appended claims.

What is claimed is:

1. In a process for recovering polybasic acids and other valuable tobacco constituents contained as solutes in a water extract obtained from denicotinized tobacco, the acids being present in the form of their salts, the extract also containing insoluble material including albuminous matter and pectin, the steps of subjecting the extract to high speed centrifugal separation, evaporating the extract to concentrate it and reduce its volume, again subjecting the extract to high speed centrifugal separation, adding calcium chloride and alcohol to the extract to precipitate the salts of the polybasic acids as calcium salts of the same, recovering the salts from the extract by high speed centrifugal separation and converting them into their acids.

2. In a process for recovering polybasic acids and other valuable tobacco constituents contained as solutes in a water extract obtained from denicotinized tobacco, the acids being present in the form of their salts, the extract also containing insoluble material including albuminous matter and pectin, the steps of subjecting the extract to high speed centrifugal separation, evaporating the extract to concentrate it and reduce its volume while adding a neutral astringent thereto, again subjecting the extract to high speed centrifugal separation, adding calcium chloride and alcohol to the extract to precipitate the salts of the polybasic acids as calcium salts of the same, recovering the salts from the extract by high speed centrifugal separation and converting them into their acids.

3. In a process for recovering polybasic acids and other valuable tobacco constituents contained as solutes in a water extract obtained from denicotinized tobacco, the acids being present in the form of their salts, the extract also containing insoluble material including albuminous matter and pectin, the steps of subjecting the extract to high speed centrifugal separation, evaporating the extract to concentrate it and reduce its volume while adding an astringent thereto from the class consisting of alum, iron chloride and sumac, again subjecting the extract to high speed centrifugal separation, adding calcium chloride and alcohol to the extract to precipitate the salts of the polybasic acids as calcium salts of the same, recovering the salts from the extract by high speed centrifugal separation and converting them into their acids.

4. In a process for recovering the organic acids and other valuable constituents of tobacco present as solutes in an extract obtained from denicotinized tobacco, albuminous matter and pectin being present in the extract as insoluble material, the steps of removing the albuminous matter and pectin by subjecting the extract to successive stages of high speed centrifugal separation, precipitating the acids in a form of their salts and separating the precipitates from the extract.

5. In a process for recovering the organic acids and other valuable constituents of tobacco present as solutes in an extract obtained from denicotinized tobacco, albuminous matter and pectin being present in the extract as insoluble material, the steps of removing said albuminous matter and pectin by subjecting the extract to successive stages of high speed centrifugal separation, precipitating the acids in the form of their salts, and separating the precipitates from the extract, the albuminous matter and pectin being coagulated prior to the stage of centrifugal separation preceding precipitation of said salts.

6. In a process for recovering the organic acids and other valuable constituents of tobacco present as solutes in an extract obtained from denicotinized tobacco, albuminous matter and pectin being present in the extract as insoluble material, the steps of removing said albuminous mattter and pectin by subjecting the extract to successive stages of high speed centrifugal separation, precipitating the acids in a form of their salts, and separating the precipitates from the extract, the albuminous matter and pectin being coagulated by adding a neutral astringent to the extract prior to the stage of centrifugal separation preceding precipitation of said salts.

7. In a process for recovering the organic acids and other valuable constituents of tobacco present as solutes in an extract obtained from denicotinized tobacco, albuminous matter and pectin being present in the extract as insoluble material, the steps of removing the albuminous matter and pectin by subjecting the extract to successive stages of high speed centrifugal separation, precipitating the acids in a form of their salts, and separating the precipitates from the extract, the albuminous matter and pectin being coagulated by adding an astringent from the class consisting of alum, iron chloride and sumac to the extract prior to the stage of centrifugal separation preceding precipitation of said salts.

8. In a process for recovering the organic acids and other valuable constituents of tobacco present as solutes in an extract obtained from denicotinized tobacco, albuminous matter and pectin being present in the extract as insoluble material, the steps of removing the albuminous matter and pectin by subjecting the extract to successive stages of high speed centrifugal separation, precipitating the acids in a form of their salts and separating the precipitates from the extract, the extract being concentrated by evaporation and the albuminous matter and pectin being coagulated by adding a neutral astringent to the extract prior to the stage of centrifugal separation preceding precipitation of said salts.

9. In a process for recovering the organic acids and other valuable constituents of tobacco present as solutes in an extract obtained from denicotinized tobacco, albuminous matter and pectin being present in the extract as insoluble material, the steps of removing the albuminous matter and pectin by subjecting the extract to successive stages of high speed centrifugal separation, precipitating the acids in a form of their salts, and recovering the remaining solutes of the extract as a still deposit upon distillation of the extract.

10. In a process for recovering the organic acids and other valuable constituents of tobacco present as solutes in a water extract obtained from denicotinized tobacco, the acids being in the form of their dissolved ammonia salts, and albuminous matter and pectin being present in the extract as insoluble material, the steps of removing the albuminous matter and pectin by subjecting the extract to successive stages of high speed centrifugal separation, precipitating the acids in the form of calcium salts and separating the precipitates from the extract.

11. In a process for recovering the organic acids and other valuable constituents of tobacco present as solutes in a water extract obtained from denicotinized tobacco, the acids being in the form of their dissolved ammonia salts, and albuminous matter and pectin being present in the extract as insoluble material, the steps of removing the albuminous matter and pectin by subjecting the extract to successive stages of high speed centrifugal separation, precipitating the acids in the form of calcium salts and separating the precipitates from the extract, the albuminous matter and pectin being coagulated by adding an astringent from the class consisting of alum, iron chloride and sumac to the extract prior to the stage of centrifugal separation preceding precipitation of said salts.

12. In a process for recovering the organic acids and other valuable constituents of tobacco present as solutes in a water extract obtained from denicotinized tobacco, the acids being in the form of their dissolved ammonia salts, and albuminous matter and pectin being present in the extract as insoluble material, the steps of removing the albuminous matter and pectin by subjecting the extract to successive stages of high speed centrifugal separation, precipitating the acids in the form of calcium salts and recovering the remaining solutes of the extract as a still deposit upon distillation of the extract.

13. In a process for recovering the organic acids and other valuable constituents of tobacco present as solutes in a water extract obtained from denicotinized tobacco, the acids being in the form of their dissolved ammonia salts, and albuminous matter and pectin being present in the extract as insoluble material, the steps of subjecting the extract to high speed centrifugal separation, evaporating the extract to concentrate it, coagulating the albuminous matter and pectin by adding a neutral astringent to the extract, again subjecting the extract to high speed centrifugal separation, adding calcium chloride and alcohol to the extract to precipitate the salts of said acids and recovering the solutes remaining in the extract as a still deposit upon distillation of the extract.

JENNIE CAMPBELL RADER,
*Administratrix for the Estate of Lyell M. Rader, Deceased.*